(12) United States Patent
Naoi et al.

(10) Patent No.: US 10,830,273 B2
(45) Date of Patent: Nov. 10, 2020

(54) CABLE COUPLING MECHANISM

(71) Applicants: HONDA MOTOR CO., LTD., Tokyo (JP); HI-LEX CORPORATION, Hyogo (JP)

(72) Inventors: Daisuke Naoi, Saitama (JP); Yuya Yamaguchi, Hyogo (JP)

(73) Assignees: Honda Motor Co., LTD, Tokyo (JP); Hi-Lex Corporation, Hyogo (JP)

(*) Notice: Subject to any disclaimer, the term of this patent is extended or adjusted under 35 U.S.C. 154(b) by 0 days.

(21) Appl. No.: 15/559,469

(22) PCT Filed: Mar. 17, 2016

(86) PCT No.: PCT/JP2016/058526
§ 371 (c)(1),
(2) Date: Sep. 19, 2017

(87) PCT Pub. No.: WO2016/152726
PCT Pub. Date: Sep. 29, 2016

(65) Prior Publication Data
US 2018/0119723 A1    May 3, 2018

(30) Foreign Application Priority Data

Mar. 23, 2015   (JP) ................................ 2015-060086

(51) Int. Cl.
*F16C 1/10* (2006.01)
(52) U.S. Cl.
CPC .......... *F16C 1/101* (2013.01); *F16C 2326/01* (2013.01)
(58) Field of Classification Search
CPC .. F16C 1/10; F16C 1/101; F16C 1/102; F16C 1/103; F16C 1/105; F16C 1/106;
(Continued)

(56) References Cited

U.S. PATENT DOCUMENTS

| | | | |
|---|---|---|---|
| 2002/0175028 A1* | 11/2002 | Liu | ....................... B60T 11/046 188/24.21 |
| 2006/0053939 A1 | 3/2006 | Basile et al. | |

(Continued)

FOREIGN PATENT DOCUMENTS

| | | |
|---|---|---|
| CN | 2643063 | 9/2004 |
| CN | 1724887 | 1/2006 |

(Continued)

OTHER PUBLICATIONS

Machine Translation of EP 2400171, obtained Aug. 6, 2018.*
(Continued)

*Primary Examiner* — Richard W Ridley
*Assistant Examiner* — Brian J McGovern
(74) *Attorney, Agent, or Firm* — Perman & Green, LLP

(57) ABSTRACT

A cable coupling mechanism 1 including a slider 2, and a slider housing member 3, wherein the slider 2 has cable connecting portions 22a, 22b to which cables C1, C2 are connected at both end in a sliding direction D1, the slider housing member 3 includes a main opening 36 opened in a direction D2 perpendicular to a sliding direction axis and a cable insertion opening 37a, 37b, the cable coupling mechanism 1 includes a movement-restricting mechanism R capable of restricting the slider 2 from moving in the direction D2, the movement-restricting mechanism R includes a housing member-side contact portion R1 and a slider-side contact portion R2 being contactable with the housing member-side contact portion R1 when a force in the direction D2 is applied to the slider.

4 Claims, 5 Drawing Sheets

(58) Field of Classification Search
CPC ...... F16C 1/12; F16C 1/20; F16C 1/14; F16C 1/145; F16C 1/16; F16C 1/18; F16C 1/262
See application file for complete search history.

(56) References Cited

U.S. PATENT DOCUMENTS

| | | | | |
|---|---|---|---|---|
| 2008/0178703 | A1* | 7/2008 | Anderson | F16C 1/101 74/502.4 |
| 2017/0051781 | A1* | 2/2017 | Sano | F16C 1/145 |

FOREIGN PATENT DOCUMENTS

| | | | | |
|---|---|---|---|---|
| CN | 103373398 | | 10/2013 | |
| CN | 203358702 | | 12/2013 | |
| EP | 2400171 A1 | * | 12/2011 | F16C 1/101 |
| GB | 765877 | | 1/1957 | |
| JP | 5985412 | | 6/1984 | |
| JP | 63044565 | | 11/1988 | |
| JP | 2001545281 A | * | 8/2001 | |
| JP | 2007118802 A | * | 5/2007 | |
| JP | 200882448 | | 4/2008 | |
| JP | 2014009708 | | 1/2014 | |

OTHER PUBLICATIONS

Machine Translation of JP 2007-118802, obtained Apr. 16, 2019.*
Machine Translation of JP 2001-545281, obtained Apr. 16, 2019.*
International Preliminary Report on Patentability, International Application No. PCT/JP2016/058526, dated Oct. 5, 2017.
International Search Report, International Application No. PCT/JP2016/058526, dated Jun. 21, 2016.
Chinese Office Action for Chinese Application No. 201680017757.9 dated Mar. 25, 2019.

* cited by examiner

CABLE COUPLING MECHANISM

CROSS REFERENCE TO RELATED APPLICATIONS

This application is the National Stage of International Application No. PCT/JP2016/058526 having International Filing Date, 17 Mar. 2016, which designated the United States of America, and which International Application was published under PCT Article 21(2) as WO Publication No. 2016/152726 A1, and which claims priority from, and the benefit of, Japanese Patent Application No. 2015-060086, filed on 23 Mar. 2015, the disclosures of which are incorporated herein by reference in their entireties.

TECHNICAL FIELD

The present invention relates to a cable coupling mechanism for coupling a plurality of cables.

BACKGROUND ART

Patent Document 1, as illustrated in FIG. 5, discloses a coupling device 100 coupling two control cables. The coupling device 100, as illustrated in FIG. 5, couples a first control cable 101 extending from one side and a second control cable 102 extending from the other side. The coupling device 100 includes a casing 103 and a slider 104 moving in the casing 103. The casing 103 is formed to have a substantially cylindrical shape and has openings formed at both ends. Cylindrical caps 105a and 105b are fixed to both ends of the casing 103 in an axis direction thereof. A first outer cable 101a of the first control cable 101 and a second outer cable 102a of the second control cable 102 have end portions fixed to the caps 105a and 105b provided at both ends of the casing 103, respectively. First and second inner cables 101b and 102b are inserted through the caps 105a and 105b and fixed to the slider 104.

In case of coupling the first and second inner cables 101b and 102b in the coupling device 100, the end portion of the first inner cable 101b is engaged with the slider 104 beforehand. The slider 104 coupled with the first inner cable 101b is housed into the casing 103, and then, an engaging portion 107 of the second inner cable 102b is engaged with the slider 104 through an opening 106, and connect the second inner cable 102b to the slider 104. The opening 106 is formed at an end portion of casing 103 in a slider sliding direction. When the engaging portion 107 of the second inner cable 102b is connected to the slider 104, the engaging portion 107 is pushed toward the opening 106 along the slider sliding direction. The slider 104 is suppressed from being pushed toward the first inner cable 101b side by a spring 108. The engaging portion 107 slides along an inclined surface 109 formed on the slider 104, and climbs over the top of the inclined surface 109, and thereby, the engaging portion 107 engages with the slider 104.

PRIOR ART DOCUMENT

Patent Document

Patent Document 1: JP 2014-9708 A

SUMMARY OF THE INVENTION

Problem to be Solved by the Invention

As described above, in the coupling device 100 of Patent Document 1, the inclined surface 109 is formed on the slider 104 to cause the engaging portion 107 of the second inner cable 102b to slide on the inclined surface 109 so that the second inner cable 102b can be coupled to the slider 104. Further, it is necessary to engage the first inner cable 102a with the slider 104 beforehand to engage the engaging portion 107 of the second inner cable 102b with the slider 104. Therefore, the structure of the coupling device 100 of Patent Document 1 is complicated and the assembling is also complicated.

In view of the above-mentioned problem, the object of the present invention is to provide a cable coupling mechanism capable of facilitating the assembling of a slider or cables to be connected to the slider.

Means to Solve the Problem

A cable coupling mechanism according to the present invention is a cable coupling mechanism comprising: a slider; and a slider housing member housing the slider and having a space in which the slider is slidable, wherein the slider has cable connecting portions to which cables are connected at both end of the slider in a sliding direction, the slider housing member includes a main opening opened in a direction perpendicular to a sliding direction axis of the slider so that the slider can be inserted into the space, and a cable insertion opening opened along the sliding direction axis of the slider so that the cable can be inserted, the cable coupling mechanism includes a movement-restricting mechanism capable of restricting the slider from moving in the direction perpendicular to the sliding direction axis, the movement-restricting mechanism includes a housing member-side contact portion provided along the sliding direction of the slider so as to be contactable with the slider, and a slider-side contact portion being contactable with the housing member-side contact portion when a force in the direction perpendicular to the sliding direction axis is applied to the slider.

Further, it is preferable that the slider housing member includes a pair of sidewalls provided along the sliding direction axis, and a bottom portion connecting the pair of sidewalls, and in the movement-restricting mechanism, the housing member-side contact portion is a sidewall-side protrusion protruding from the sidewall to the space side, and the slider-side contact portion is a slider-side protrusion protruding toward the sidewall side on which the housing member-side contact portion is provided.

Further, it is preferable that width direction is a direction perpendicular to each of the sliding direction and the direction perpendicular to the sliding direction axis, and when a force for rotating the slider about an axis in the width direction is applied to the slider, the slider-side contact portion comes into contact with the housing member-side contact portion so as to function as an abutting stopper suppressing the slider from rotating about the axis in the width direction.

Further, it is preferable that width direction is a direction perpendicular to each of the sliding direction and the direction perpendicular to the sliding direction axis, and the slider can be inserted into the space by elastic deformation such that the size of the slider housing member in the width direction becomes equal to or greater than the size of the slider in the width direction.

Further, it is preferable that a bottom portion of the slider is partly in contact with and slide on the bottom portion of the slider housing member.

Effects of the Invention

The cable coupling mechanism according to the present invention can facilitate the assembling of a slider and cables to be connected to the slider.

EMBODIMENT FOR CARRYING OUT THE INVENTION

Hereinafter, a cable coupling mechanism according to the present invention will be described in detail with reference to attached drawings. A cable coupling mechanism according to an embodiment described below is merely an example, and the cable coupling mechanism according to the present invention is not limited to the drawings and the embodiment described below.

Figure 1:
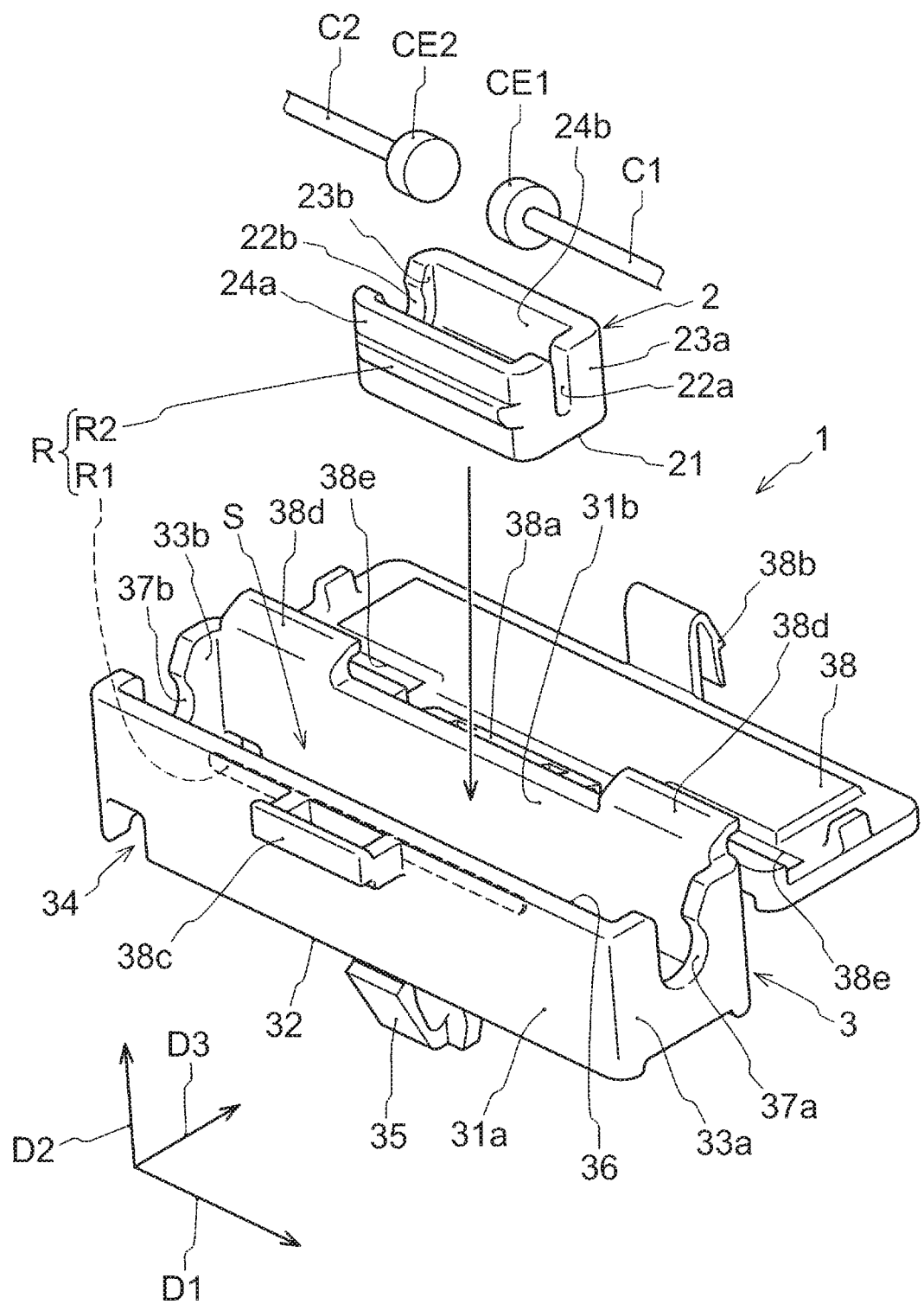
FIG. 1 illustrates an exploded perspective view of a cable coupling mechanism according to an embodiment of the present invention.
Figure 2:
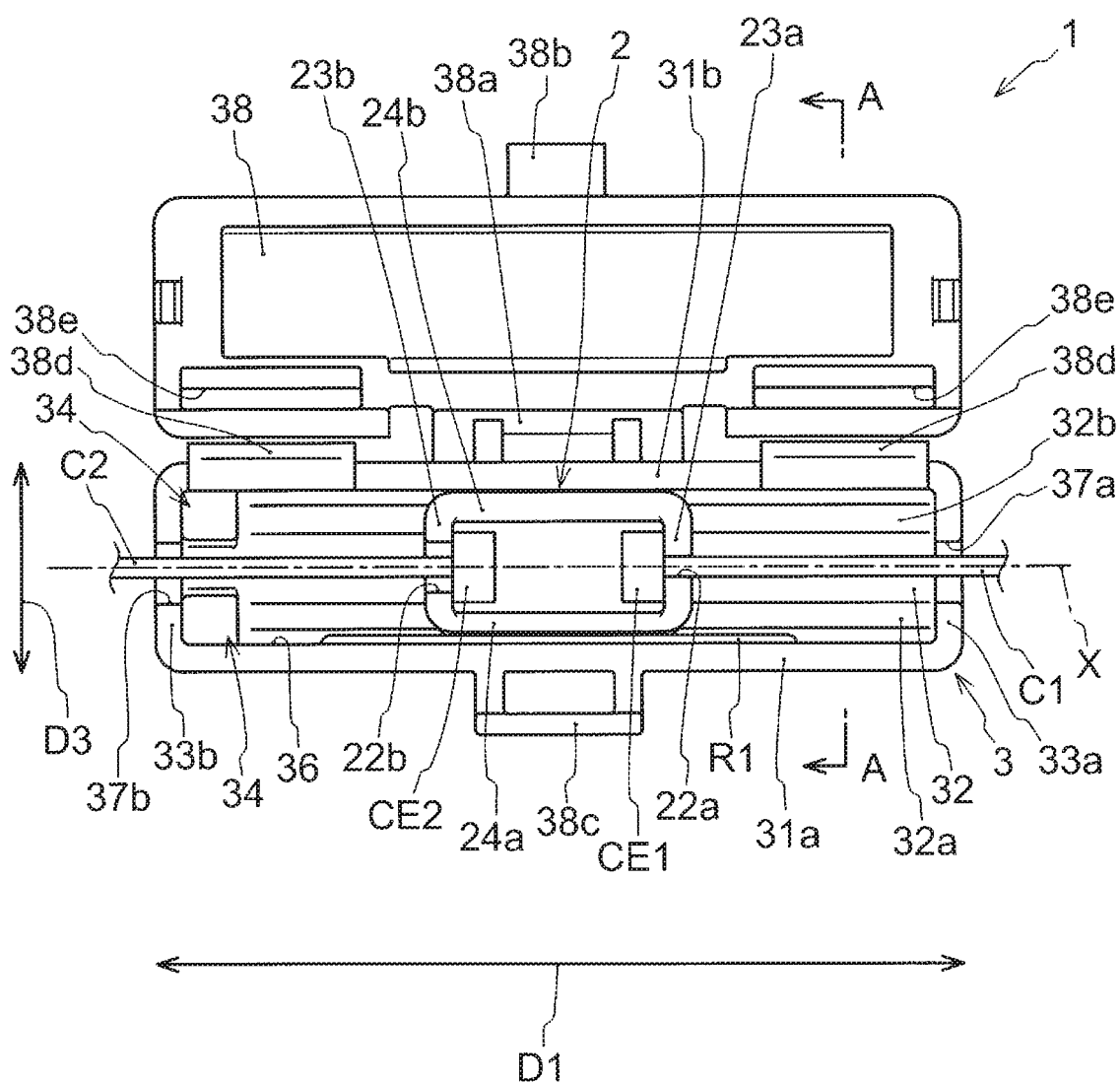
FIG. 2 illustrates a top view of the cable coupling mechanism according to the embodiment of the present invention in a state where a slider is housed in a slider housing member and the slider is connected to cables.

As illustrated in FIGS. 1 and 2, a cable coupling mechanism 1 according to the present embodiment includes a slider 2 and a slider housing member 3. The slider housing member 3 houses the slider 2, and has a space S in which the slider 2 can slide along a sliding direction D1. The cable coupling mechanism 1 couples at least two cables C1 and C2 and transmits an operation force applied to one cable C1 to the other cable C2 (or from the other cable C2 to one cable C1). One end of one cable C1 is connected to a cable coupling mechanism 1-side (i.e., slider 2-side as described below) and the other end is connected directly or indirectly to an operation part (not illustrated) for applying the operation force to the cable C1. One end of the other cable C2 is connected to the cable coupling mechanism 1-side (i.e., the slider 2 side) and the other end is connected directly or indirectly to an operated part (not illustrated). The operated part is operated by the operation force applied to the operation part with the transmission of the operation force to the cable C2 via the cable C1 and the cable coupling mechanism 1. The operation part may be configured to operate the cable and may be a manually operable unit, such as a lever or a handle, or may be an electrical operation part for pulling and operating the cable. Further, the operated part is not particularly limited as long as it is remotely operable by the operation of the operation part. For example, the operated part is a lock mechanism for an open/close member, such as a hood, a trunk, or a fuel lid of a vehicle, or a seat lock mechanism for locking a tilted state of a seat.

The cables C1 and C2 are configured to transmit the operation force applied by the operation part to the operated part. For example, widely-known control cables can be used as the cables C1 and C2. Although FIG. 1 illustrates only the inner cables of the control cables (i.e., the cables C1 and C2), an outer casing (not illustrated) for inserting the inner cable may be provided.

As illustrated in FIG. 1, the cable coupling mechanism 1 according to the present embodiment includes the slider 2 and the slider housing member 3 housing the slider 2. One ends of the cables C1 and C2 are respectively connected to the slider 2, and the slider 2 is housed in the slider housing member 3. The slider 2 has a bottom portion 21 with a sliding surface which is slidable relative to the slider housing member 3. The slider 2 slides in the slider housing member 3 by a pulling operation of the cable C1 or the cable C2.

Further, in order to connect the cables C1 and C2, the slider 2 has cable connecting portions 22a and 22b where the cables C1 and C2 are connected, at both end portions of the slider 2 in the sliding direction D1, as illustrated in FIGS. 1 and 2. The cable connecting portions 22a and 22b are portions to which end portions of the cables C1 and C2 are connected. The method for connecting the end portions of the cables C1 and C2 to the cable connecting portions 22a and 22b is not particularly limited and for example, engagement connection or welding is employable. For example, cable ends CE1 and CE2 which are provided at the end portion of the cable C1 and C2 engage with the cable connection portions 22a and 22b, and thereby the cables C1 and C2 can be connected to the slider 2.

In the present embodiment, the slider 2 has wall portions 23a and 23b standing from both ends of the bottom portion 21 in the sliding direction D1. The cable connecting portions 22a and 22b are formed in the wall portions 23a and 23b. In the present embodiment, the cable connecting portions 22a and 22b penetrate the wall portions 23a and 23b in the sliding direction D1 and are formed into slit shapes extending in a direction D2 perpendicular to the sliding direction axis X of the slider 2 (refer to FIG. 2), that is, in a direction departing from the bottom portion 21 (refer to FIG. 1). The cable connection portions 22a and 22b which are formed into slit shapes extend up to end edges of the wall portions 23a and 23b (i.e., end edges on the opposite side of the bottom portion 21), so that the attachment of the cables C1 and C2 can be facilitated. According to the present embodiment, the cables C1 and C2 are engaged with the cable connecting portions 22a and 22b and one end surfaces of cylindrical (substantially cylindrical) cable ends CE1 and CE2 are brought into face contact with inner faces of the wall portions 23a and 23b by pulling operation of the cables C1 and C2.

In the present embodiment, as illustrated in FIGS. 1 and 2, a pair of sidewalls 24a and 24b extending in the sliding direction D1 are formed in the slider 2 to connect the pair of wall portions 23a and 23b, in addition to the pair of the wall portions 23a and 23b. The slider 2 is formed into a box shape which has an opening in the direction D2 perpendicular to the sliding direction axis X. However, the shape of the slider 2 is not limited to the present embodiment and can be any other shape, such as polygonal cylindrical shape, cylindrical shape, or semi-cylindrical shape, as long as it can connect the cables C1 and C2 and slidable in the slider housing member 3 and can provide a movement-restricting mechanism R described below.

The slider housing member 3 houses the slider 2 slidably. The slider housing member 3 is attached to an attaching object, such as a bracket, a panel, a vehicle body or the like. Therefore, the slider housing member 3 relays and connects the cables C1 and C2 with the slider 2 at a predetermined position. In order to house the slider 2, the slider housing member 3 has the space S in which the slider 2 is slidable, as illustrated in FIG. 1. When one cable C1 is operated, the slider 2 slides in the sliding direction D1 in the space S and the other cable C2 is operated to transmit the operation force.

Figure 3:
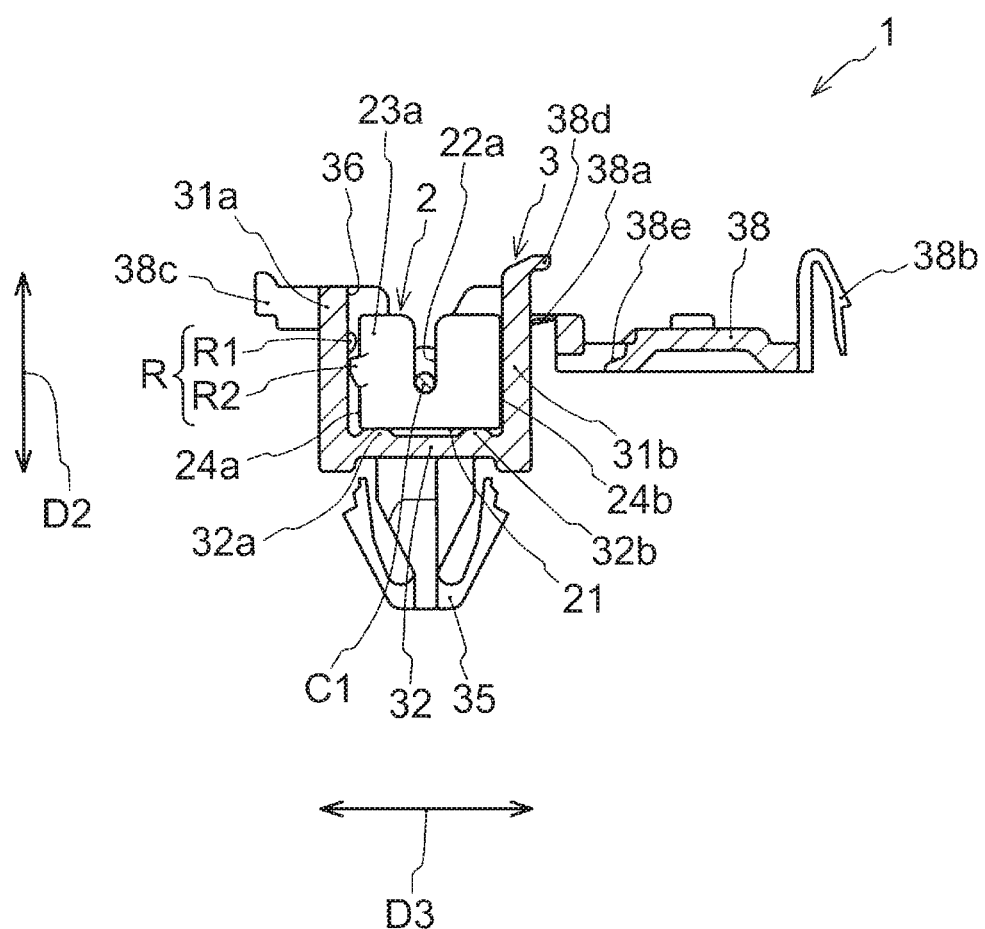
FIG. 3 illustrates a cross-sectional view taken along a line A-A illustrated in FIG. 2.

In the present embodiment, as illustrated in FIGS. 1 to 3, the slider housing member 3 includes a pair of the sidewalls 31a and 31b provided along the sliding direction axis X, and a planar bottom portion 32 connecting the pair of sidewalls 31a and 31b. Further, the slider housing member 3 includes endwalls 33a and 33b standing from the bottom portion 32 at both ends of the slider 2 in the sliding direction D1 and the endwalls 33a and 33b connect the pair of sidewalls 31a and 31b. In the present embodiment, the space S is defined by the pair of sidewalls 31a and 31b, the pair of endwalls 33a and 33b, and the bottom portion 32. The space S may be configured as a space not constituted by the pair of sidewalls 31a and 31b, the pair of endwalls 33a and 33b, and the bottom portion 32, as long as the slider 2 is slidable in the space.

In the present embodiment, the bottom portion 32 of the slider housing member 3 faces the bottom portion 21 of the slider 2 when the slider 2 is housed in the slider housing member 3, and the bottom portion 32 constitutes a sliding surface on which the bottom portion 21 of the slider 2 can slide. The structure of the bottom portion 21 of the slider 2 is not particularly limited as long as the slider 2 can slide on the bottom portion 32 of the slider housing member 3. For example, the bottom portion 21 of the slider 2 is partly in contact with and slides on the bottom portion 32 of the slider housing member 3. A part of the bottom portion 21 of the slider 2 comes in contact with and slides on the bottom portion 32 of the slider housing member 3, and thereby the sliding resistance between the slider 2 and the slider housing member 3 can be reduced and accordingly the slidability of the slider 2 can be improved, compared with the case where the bottom portion 21 of the slider 2 is entirely in contact with and slides on the bottom portion 32 of the slider housing member 3.

The configuration that the bottom portion 21 of the slider 2 is partly in contact with and slides on the bottom portion 32 of the slider housing member 3 is, for example, as illustrated in FIGS. 2 and 3, a configuration including a pair of projecting lines 32a and 32b formed on the bottom portion 32 of the slider housing member 3 and extending in the sliding direction D1, so that the bottom portion 21 of the slider 2 comes into contact with the projecting lines 32a and 32b of the bottom portion 32. Such a configuration can reduce a contact area between the bottom portion 21 of the slider 2 and the bottom portion 32 of the slider housing member 3. Further, instead of the projecting lines 32a and 32b, a plurality of protrusions may be formed on the bottom portion 32 of the slider housing member 3. Further, one or more grooves extending in the sliding direction D1 may be formed on the bottom portion 32 of the slider housing member 3. Further, instead of providing the projecting lines 32a and 32b on the bottom portion 32 of the slider housing member 3, projecting lines or protrusions may be provided on the bottom portion 21 of the slider 2 side, and the contact area between the bottom portion 21 of the slider 2 and the bottom portion 32 of the slider housing member 3 can be reduced.

Further, as illustrated in FIGS. 1 and 2, the bottom portion 32 of the slider housing member 3 may be configured to form a communicating hole 34 for communicating the space S in the slider housing member 3 with an external space outside the slider housing member 3. By forming the communicating hole 34, for example, when liquid, such as water, flows into the slider housing member 3, the liquid can be discharged through the communication hole 34 formed on the bottom portion 32. In the present embodiment, two communicating holes 34 are formed at corners on one end portion of the bottom portion 32 in the sliding direction D1. Alternatively, the communicating holes 34 can be provided on both sides of the bottom portion 32 in the sliding direction D1 or can be provided at another positions. The position and the number of the communicating hole 34 to be formed in the bottom portion 32 are not particularly limited. As described above, in the case where the pair of projecting lines 32a and 32b or the grooves extending along the sliding direction D1 are formed in the bottom portion 32 of the slider housing member 3 and the communicating hole 34 is formed at end portion of the projecting lines 32a and 32b or the grooves, it is possible to guide the liquid such as water, which flows into the slider housing member 3, to the communicating holes 34 along the projecting lines 32a and 32b or the grooves. Therefore, liquid such as water hardly stays in the inside of the slider housing member 3 and it is possible to suppress the liquid such as water from remaining in the slider housing member 3.

A fitting portion 35 for attaching the slider housing member 3 to an attaching object, such as a vehicle body, is provided on another surface of the bottom portion 32, opposing to the surface facing the bottom portion 21 of the slider 2. By inserting the fitting portion 35 into a fitted portion, such as a hole, provided on the attaching object, the cable coupling mechanism 1 can be attached to the attaching object such as the vehicle body.

The sidewalls 31a and 31b of the slider housing member 3 are provided along the sliding direction D1. In the present embodiment, as illustrated in FIGS. 1 to 3, the sidewalls 31a and 31b are shown as planar sidewalls extending substantially perpendicularly from side edges extending in the sliding direction D1 of the planar bottom portion 32. The sidewalls 31a and 31b are disposed substantially parallel to each other and guide the slider 2 along the sliding direction D1 between the pair of sidewalls 31a and 31b. In the present embodiment, as illustrated in FIGS. 2 and 3, the pair of sidewalls 31a and 31b of the slider housing member 3 face the pair of sidewalls 24a and 24b of the slider 2 each other so as to suppress the slider 2 from rotating about the sliding direction axis X (i.e., suppress at least a part of the slider 2 from moving in a direction approaching a main opening 36). Although the sidewalls 31a and 31b are formed in planar shape in the present embodiment, the shapes of the sidewalls 31a and 31b are not particularly limited and can be appropriately changed according to the shape of the slider 2 to be housed in the slider housing member 3. For example, the sidewalls 31a and 31b may have curved surfaces or other shapes.

Figure 5:
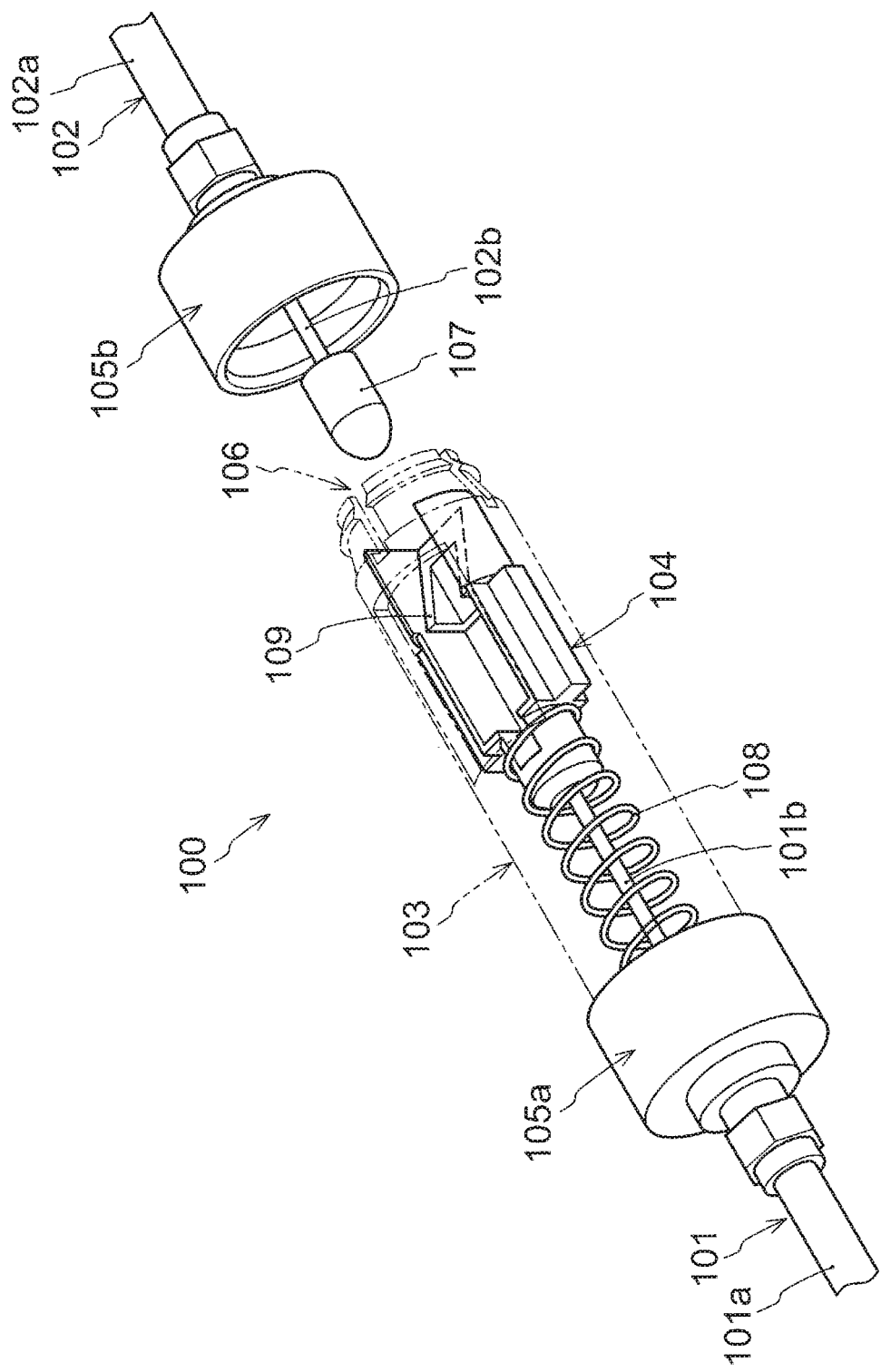
FIG. 5 illustrates a perspective view of a conventional coupling device.

The slider housing member 3, as illustrated in FIGS. 1 and 2, includes a main opening 36 and cable insertion openings 37a and 37b. The main opening 36 opens in the direction D2 perpendicular to the sliding direction axis X of the slider 2, and the cable insertion openings 37a and 37b open on the sliding direction axis X of the slider 2. The main opening 36 opens so that the slider 2 can be inserted into the space S, and therefore, the slider 2 can be housed in the slider housing member 3 from the direction D2 perpendicular to the sliding direction axis X. Assembling the slider 2 into the slider housing member 3 from the main opening 36 side opened in the direction D2 perpendicular to the sliding direction axis X is easy, compared to a case where the slider 2 is inserted and assembled from the opening opened to the sliding direction D1 side (e.g., the opening 106 illustrated in FIG. 5), and can improve workability of the assembling. Further, when the main opening 36 is not covered with a lid member 38 described below, it is easy to connect the cables C1 and C2 to the slider 2.

In the present embodiment, the main opening 36 is defined by end edges of the pair of sidewalls 31a and 31b and the pair of endwalls 33a and 33b, which are opposite to the bottom portion 32. In the present embodiment, the opening direction of the main opening 36 is a direction opposed to the bottom portion 32, of directions perpendicular to the sliding direction axis X and the sliding direction D1, and is a substantially vertical direction when the sliding direction axis X is set to be a horizontal direction. In the present embodiment, to enable housing the slider 2 in the slider housing member 3, the length of the main opening 36 in the sliding direction D1 is formed to be longer than the length of the slider 2 in the sliding direction D1. When width direction D3 is a direction perpendicular to each of the sliding direction D1 and the direction D2 perpendicular to the sliding direction axis X (i.e., the opening direction of the main opening 36 in the present embodiment) (refer to FIGS. 1 to 3), the length of the main opening 36 in the width direction D3 is formed to be longer than the length of the slider 2 in the width direction D3. In the present embodiment, the main opening 36 of the slider housing member 3 wholly opens in upper area of space S extending along the sliding direction D1. However, as long as the size of the main opening 36 is sufficient to house the slider 2, the main opening 36 can be formed to partly open along the sliding direction D1 of the space S, so that the space S can be covered partly.

The cable insertion openings 37a and 37b are opened so that the cables C1 and C2 can be inserted. As long as the cables C1 and C2 can be inserted, an outer casing (not illustrated), such as, a casing cap provided at an end portion of the outer casing, can be fixed to the cable insertion openings 37a and 37b. In the present embodiment, as illustrated in FIGS. 1 and 2, the cable insertion openings 37a and 37b are formed in the endwalls 33a and 33b of the slider housing member 3. In the present embodiment, the cable insertion openings 37a and 37b penetrate into the endwalls 33a and 33b in the sliding direction D1 and are formed to have slit-like shape extending in the direction D2 perpendicular to the sliding direction axis X of the slider 2. The slit-like cable insertion openings 37a and 37b extend to the end edges of the endwalls 33a and 33b and communicate with the main opening 36. In this case, when connecting the cables C1 and C2 to the slider 2 from the main opening 36 side, the assembling direction of the slider 2 and the direction along which the cables C1 and C2 are assembled with the cable insertion openings 37a and 37b are the same direction (i.e., an arrow direction from the slider 2 to the slider housing member 3 in FIG. 1). Therefore, the assembling is further facilitated and the workability can be improved. In particular, as described in the present embodiment, when the main opening 36 of the slider housing member 3, the cable connecting portions 22a and 22b of the slider 2, and the cable insertion openings 37a and 37b of the slider housing member 3 are all the same in opening direction (i.e., the opening direction D2 of the main opening 36), the assembling direction of the slider 2 becomes identical to the assembling direction of the cables C1 and C2 to the cable connecting portions 22a and 22b and the cable insertion openings 37a and 37b. Therefore, the assembling is further facilitated and the workability can be improved.

Further, as illustrated in FIGS. 1 to 3, the slider housing member 3 can include a lid member 38. The lid member 38 can be provided to cover at least a part of the main opening 36 of the slider housing member 3. Providing the lid member 38 enables closing the main opening 36 after the slider 2 and the cables C1 and C2 are assembled in the slider housing member 3. Therefore, in addition to the above-mentioned improvement of the workability, it is possible to suppress the entry of foreign substances, e.g., liquid such as water or dusts, into the slider housing member 3 only by closing the lid member 38. Further, it is possible to suppress the cable ends CE1 and CE2 of the cables C1 and C2 from coming out of the cable connecting portions 22a and 22b by closing the main opening 36 with the lid member 38. In particular, as described in the present embodiment, providing the lid member 36 in such a way as to entirely cover the main opening 36 is preferable in that the above-mentioned entry of foreign substances and the coming out of the cable ends CE1 and CE2 from the cable connecting portions 22a and 22b can be further suppressed.

In the present embodiment, the lid member 38 is connected via a hinge portion 38a to an upper end side of one sidewall 31b (i.e., an end portion of the sidewall 31b on the main opening 36 side, which is opposite to the bottom portion 32). The lid member 38 can rotate about a rotation axis substantially parallel to the sliding direction axis X. In this case, the lid member 38, even if the lid member 38 is opening when assembling the slider 2 and the cables C1 and C2, the lid member 38 does not become an obstacle in the assembling of the slider 2 and the cables C1 and C2, since the lid member 38 is not positioned in the assembling direction of the cables C1 and C2, and therefore the assembling work can be smoothly performed. In the present embodiment, the lid member 38 includes a locking claw 38b to hold a closed state when the lid member 38 is closed. The locking claw 38b is engaged with an engaged portion 38c provided on the other sidewall 31a, which is opposed to the sidewall 31b on which the hinge portion 38a is provided, and holds the closed state of the slider housing member 3. Further, in the present embodiment, as illustrated in FIGS. 1 to 3, the slider housing member 3 has an engaging protrusion 38d. The engaging protrusion 38d inclinedly protrudes from the upper end of one sidewall 31b to the outside of the sidewall 31b in the width direction D3 (refer to FIG. 3), and extends in the sliding direction D1 along the upper end of the sidewall 31b. On the other hand, an engaging hole 38e is formed on the lid member 38. The engaging hole 38e can engage with the engaging protrusion 38d when the lid member 38 is rotated in the closing direction. Since the engaging protrusion 38d engages with the engaging hole 38e, the lid member 38 can be held in the closed state even when the hinge portion 38a of the lid member 38 is broken and the lid member 38 and the sidewall 31b are separated at the hinge portion 38a.

Further, as illustrated in FIGS. 1 to 3, a movement-restricting mechanism R is provided to the cable coupling mechanism 1. The movement-restricting mechanism R restricts the slider 2 from moving in the direction D2 perpendicular to the sliding direction axis X. The movement-restricting mechanism R restricts the movement of the slider 2 in the direction D2 perpendicular to the sliding direction axis X, that is, the movement of the slider 2 housed in the slider housing member 3 toward the main opening 36 side. The movement-restricting mechanism R includes, as illustrated in FIGS. 1 to 3, a housing member-side contact portion R1 provided contactably with the slider 2 along the sliding direction D1 of the slider 2, and a slider-side contact portion R2. The slider-side contact portion R2 can contact with the housing member-side contact portion R1.

when a force in the direction D2 perpendicular to the sliding direction axis X is applied to the slider 2. The movement-restricting mechanism R can restrict the slider 2 from moving in the direction D2 perpendicular to the sliding direction axis X in various states, by causing the housing member-side contact portion R1 to come into contact with the slider-side contact portion R2.

Hereinafter, the above-mentioned restriction of the movement will be described in more detail. For example, Assembling becomes easy in the cable coupling mechanism 1 because the slider 2 can be assembled from the main opening 36 opened in the direction D2 perpendicular to the sliding direction axis X, as described above. If the cable coupling mechanism 1 does not include the movement-restricting mechanism R, the slider 2 may move toward the main opening 36 by a tensile force and vibration from the cable, or the like, or in some cases, the slider 2 may fall off as a result of the movement. Therefore, assembling the slider with cables becomes difficult. In the present embodiment, providing the movement-restricting mechanism R can facilitate the assembling of the slider 2 and restrict the movement of the slider 2 toward the main opening 36 or the falling-off of the slider 2, and can improve the workability in the assembling of the cable coupling mechanism 1. Further, for example, when the cable coupling mechanism 1 is transported in a state where the slider 2 is housed in the slider housing member 3, or when the cable coupling mechanism 1 is moved to the vicinity of an attaching object, such as a vehicle body, it is possible to suppress the slider 2 from unexpectedly falling out of the slider housing member 3 even in a case where the slider housing member 3 inclines and the main opening 36 faces downward.

The housing member-side contact portion R1 is provided in the slider housing member 3 and is located at a position where it can come into contact with the slider 2, particularly, at a position where it can come into contact with the slider-side contact portion R2 of the slider 2 in the direction D2 perpendicular to the sliding direction axis X. The expression "when a force in the direction D2 perpendicular to the sliding direction axis X is applied to the slider 2" includes a case where an external force is directly applied to the slider 2 by the cables C1 and C2 or a worker and a case where a force in the direction D2 perpendicular to the sliding direction axis X acts by gravity or the like. Further, the force in the perpendicular direction is not strictly limited to only the force applied in the perpendicular direction and can be another force including a component in the perpendicular direction. Further, in the present specification, "restricting the slider 2 from moving in the direction D2 perpendicular to the sliding direction axis X" means restricting the slider 2 from moving beyond a predetermined range in the direction D2 perpendicular to the sliding direction axis X (for example, restricting the slider 2 from moving until the slider 2 gets away or partly protrudes from the main opening 36). The expression does not intend to indicate only the case where the slider 2 does not move at all in the direction D2 perpendicular to the sliding direction axis X. Accordingly, in the state where the slider 2 is housed in the slider housing member 3, the housing member-side contact portion R1 and the slider-side contact portion R2 may be away in the direction D2 perpendicular to the sliding direction axis X.

As long as the housing member-side contact portion R1 and the slider-side contact portion R2 can contact with each other and can restrict the slider 2 from moving in the direction D2 perpendicular to the sliding direction axis X, their structures are not particularly limited. For example, in the present embodiment, as illustrated in FIGS. 1 to 3, the housing member-side contact portion R1 can be a sidewall-side protrusion protruding from the sidewall 31b toward the space S side (hereinafter, both the housing member-side contact portion and the sidewall-side protrusion are denoted by reference sign R1) and the slider-side contact portion R2 can be a slider-side protrusion protruding toward the sidewall 31b side on which the housing member-side contact portion R1 is provided (hereinafter, both the slider-side contact portion and the slider-side protrusion are denoted by reference sign R2). In a case where the movement of the slider 2 is restricted by the sidewall-side protrusion R1 and the slider-side protrusion R2, the structures of the slider 2 and the slider housing member 3 are simple and the slider 2 can be easily attached with the slider housing member 3. However, the housing member-side contact portion and the slider-side contact portion are not limited to the combination of the sidewall-side protrusion R1 and the slider-side protrusion R2. For example, one of the housing member-side contact portion and the slider-side contact portion can be configured as a protrusion (i.e., a sidewall-side protrusion or a slider-side protrusion) and the other of them can be configured as a recessed portion (i.e., a slider-side recessed portion or a sidewall-side recessed portion) that can engage with the protrusion.

As illustrated in FIGS. 1 to 3, the sidewall-side protrusion R1 of the slider housing member 3 can be provided on only one sidewall 31a (or the other sidewall 31b) and can be provided on both of the sidewalls 31a and 31b. In the case where the sidewall-side protrusion R1 is provided on only one sidewall 31a as illustrated in the present embodiment, assembling the slider 2 is easy because the space between the pair of sidewalls 31a and 31b does not become so narrow when housing the slider 2. Further, in the present embodiment, the sidewall-side protrusion R1 has a substantially semicircular cross section perpendicular to the sliding direction D1 and is provided so as to extend in the sliding direction D1. Forming the sidewall-side protrusion R1 with the substantially semicircular cross section perpendicular to the sliding direction D1 can facilitate the insertion of the slider 2. However, the shape of the sidewall-side protrusion R1 is not particularly limited and can be a polygonal shape, such as, a substantially triangular shape.

In the present embodiment, as illustrated in FIGS. 1 and 2, the sidewall-side protrusion R1 extends from the center of the sidewall 31a in the sliding direction D1 toward both sides of the sidewall 31a in the sliding direction D1, and the sidewall 31a includes a portion in which protrusion is not formed. In the portion in which protrusion is not formed, the sidewall-side protrusion R1 is not formed. The portion in which protrusion is not formed is provided at each end portion of the sidewall 31a in the sliding direction D1. Providing the portion in which protrusion is not formed can reduce the contact resistance between the sidewall-side protrusion R1 and the slider-side protrusion R2 when housing the slider 2 into the slider housing member 3. Therefore, the assembling of the slider 2 from the portion in which protrusion is not formed provided in both ends of the sidewall 31a in the sliding direction D1 can be facilitated. In the present embodiment, for example, the length of portion which is not formed protrusion in the sliding direction D1 can be set to a length sufficient for the sidewall-side protrusion R1 and the slider-side protrusion R2 to come into contact with each other when the wall portion 23a (or 23b) of the slider 2 contacts with the endwall 33a (or 33b) of the slider housing member 3. Accordingly, regardless of the position of the slider 2 in the space S of the slider housing member 3, it is possible to prevent the slider 2 from falling off because the sidewall-side protrusion R1 and the slider-side protrusion R2 can contact with each other.

The length and the number of the sidewall-side protrusion R1 in the sliding direction D1 are not particularly limited. For example, instead of providing the portion in which protrusion is not formed, only one sidewall-side protrusion R1 may be formed entirely in the sliding direction D1 and along the slider-side protrusion R2 or a plurality of discontinuous sidewall-side protrusions may be formed.

The slider-side protrusion R2 is provided on one sidewall 24a of the slider 2 so as to extend in the sliding direction D1, as illustrated in FIG. 1. In the case where the sidewall-side protrusion R1 is provided on each of the sidewalls 31a and 31 b, the slider-side protrusion R2 can be provided on each of the sidewalls 24a and 24b. In the present embodiment, the slider-side protrusion R2 has a substantially triangular cross section perpendicular to the sliding direction D1 and has a tapered surface facing toward the bottom portion 21 of the slider 2. Thereby, when attaching the slider 2 to the slider housing member 3, the slider-side protrusion R2 can easily climb over the sidewall-side protrusion R1. The cross-sectional shape of the slider-side protrusion R2 is not particularly limited and can be a substantially semicircular shape or a polygonal shape.

Further, in order to enable the slider-side protrusion R2 to easily climb over the sidewall-side protrusion R1 when housing the slider 2 into the slider housing member 3, it is preferable that the slider housing member 3 elastically deforms so that the size of the slider housing member 3 in the width direction D3 becomes equal to or greater than the size of the slider housing member 3 in the width direction D3, and thereby, the slider 2 can be inserted in the space S. In the above description, "the size of the slider housing member 3 in the width direction D3" is a minimum size of the slider housing member 3, which is the size in the width direction D3 inside the slider housing member 3 including the housing member-side contact portion (i.e., the sidewall side protrusion or the sidewall side recessed portion) R1. Further, "the size of the slider 2 in the width direction D3" is a maximum size of the slider 2, which is the size in the width direction D3 outside the slider 2 including the slider-side contact portion (i.e., the slider-side protrusion or the slider-side recessed portion) R2. For example, in the case of the present embodiment, the elastic deformation occurs in such a manner that the size obtainable by subtracting the protrusion length of the sidewall-side protrusion R1 in the width direction D3 from the gap between the pair of sidewalls 31a and 31b of the slider housing member 3 in the width direction D3 becomes equal to or greater than the size obtainable by adding the protrusion length of the slider-side protrusion R2 to the gap between the outer surface of one sidewall 24a of the slider 2 and the outer surface of the other sidewall 24b in the width direction D3. In this case, for example, the sidewalls 31a and 31b of the slider housing member 3 are elastically deformed by constituting the slider housing member 3 (i.e., the sidewalls 31a and 31b) from a flexible material, such as resin or metal having flexibility. Thereby, the slider 2 can be attached to the slider housing member 3 easily, and the workability is improved. The elastically deformed slider housing member 3 returns to the original state after having housed the slider 2 into the slider housing member 3 and therefore it is possible to restrict the movement in the direction D2 perpendicular to the sliding direction axis X of the slider 2.

Next, the assembling of the cable coupling mechanism 1 and the restriction of the movement of the slider 2 according to an embodiment will be described in more detail.

The slider 2 is assembled toward the slider housing member 3 from the main opening 36 from the state before the assembling of the cable coupling mechanism 1 illustrated in FIG. 1. When the slider 2 is pushed into the space S of the slider housing member 3 from the main opening 36 side, the slider-side protrusion R2 of the slider 2 climbs over the sidewall-side protrusion R1 formed on the sidewall 31a of the slider housing member 3 and the slider 2 is housed into the slider housing member 3.

When the slider 2 is housed in the slider housing member 3, as illustrated in FIG. 3, even if the slider 2 is urged to move in the direction D2 (i.e., the opening direction of the main opening 36) perpendicular to the sliding direction axis X, the slider-side protrusion R2 comes into contact with the sidewall-side protrusion R1 and restricts the slider 2 from moving toward the main opening 36 of the slider housing member 3. Accordingly, when the cable coupling mechanism 1 is transported or when the cable coupling mechanism 1 is moved to an attaching portion of a vehicle body, in a state where the main opening 36 is opened (namely, in an opened state of the lid member 38), the slider 2 does not fall out of the slider housing member 3. Further, the movement of the slider 2 in the direction D2 perpendicular to the sliding direction axis X is restricted when the cable ends CE1 and CE2 of the cables C1 and C2 are engaged with the cable connecting portions 22a and 22b of the slider 2. Therefore it is unnecessary to hold the slider 2 so as not to fall off and the cables C1 and C2 can be easily attached to the slider 2. Accordingly, the work for connecting the cables C1 and C2 can be facilitated and the workability can be improved. Further, the main opening 36 of the slider housing member 3 is opened, and all of the main opening 36, the cable connecting portions 22a and 22b, and the cable insertion openings 37a and 37b are opened in the same direction. Accordingly, the connection of the cables C1 and C2 to the slider 2 and the insertion of the cables C1 and C2 into the cable insertion openings 37a and 37b of the slider housing member 3 can be completed by only moving the cables C1 and C2 from the top side to the bottom side in FIG. 1. Therefore, the assembling work is simple and the workability can be improved.

When the connection of the cables C1 and C2 to the slider 2 completes, the lid member 38 is shut to close the main opening 36. Thereby the assembling of the cable coupling mechanism 1 is completed and the cable coupling mechanism 1 can be attached to an attaching object, such as a vehicle body, by fixing means such as the fitting portion 35. It should be noted that the housing of the slider 2 and the engagement of the cables C1 and C2 can be performed after the slider housing member 3 is attached to the attaching object in advance. It may be also possible to attach the slider housing member 3 housing the slider 2 to the attaching object and subsequently perform the engagement of the cables C1 and C2. After attachment of the cable coupling mechanism 1 to the attaching object, such as the vehicle body, is completed, the slider 2 slide in the slider housing member 3 by a pulling operation of the cables C1 and C2 and accordingly the operation force can be transmitted.

When the cable coupling mechanism 1 is attached to a front-side base body (e.g., an attaching object on a hood or in an engine room) of the vehicle, the cables C1 and C2 are arranged sterically with curving the cables C1 and C2 in many cases. In such cases, when the slider 2 slides in the slider housing member 3 by a pulling operation of the cables C1 and C2, a force for rotating the slider 2 about an axis in the width direction D3 may be applied to the slider 2. An extending direction of one cable C1 from the slider 2 to the operation part and an extending direction of the other cable C2 from the slider 2 to the operated part may be different from each other in the direction D2 perpendicular to the sliding direction axis X.

As an example, in a hood open-close mechanism of the vehicle, there is a height difference in the vertical direction of the vehicle body between the operation part such as a lever or the like, positioned on the lower side of a driver's seat, and the operated part such as a hood lock mechanism connected by the cables C1 and C2 via the cable coupling mechanism 1. Therefore, the extending direction from the slider 2 is different between one cable C1 and the other cable C2. Further, it is necessary to avoid various members in a narrow space, such as the engine room of the vehicle, in which various members are housed, and the installation space of the cable coupling mechanism 1 is limited. Therefore, the cable coupling mechanism 1 may be disposed inclinedly, to the horizontal direction, as illustrated in FIG. 4.

As mentioned above, when the cable coupling mechanism 1 is attached to the attaching object in the inclined state relative to the horizontal direction, or when the extending direction of one cable C1 from the slider 2 is different from the extending direction of the other cable C2, if a tensile force is applied by an operation of the cables C1 and C2, a force for rotating the slider 2 about an axis in the width direction D3 (i.e., depth direction of paper in FIG. 4) may be applied to the slider 2. More specifically, if a tensile force is applied to the cables C1 and C2 when the pulling direction of one cable C1 is different from the pulling direction of the other cable C2, the curvedly arranged cables C1 and C2 tend to become straight in such a way as to shorten the routing distance. In this case, the slider 2 receives a force from the cable C1 toward the lower right direction in FIG. 4 and receives a force from the cable C2 toward the upper left direction by a reaction force from the cable C2. Therefore, as indicated by an alternate long and two short dashes line in FIG. 4, the slider 2 rotates about an axis in the width direction D3.

Figure 4:
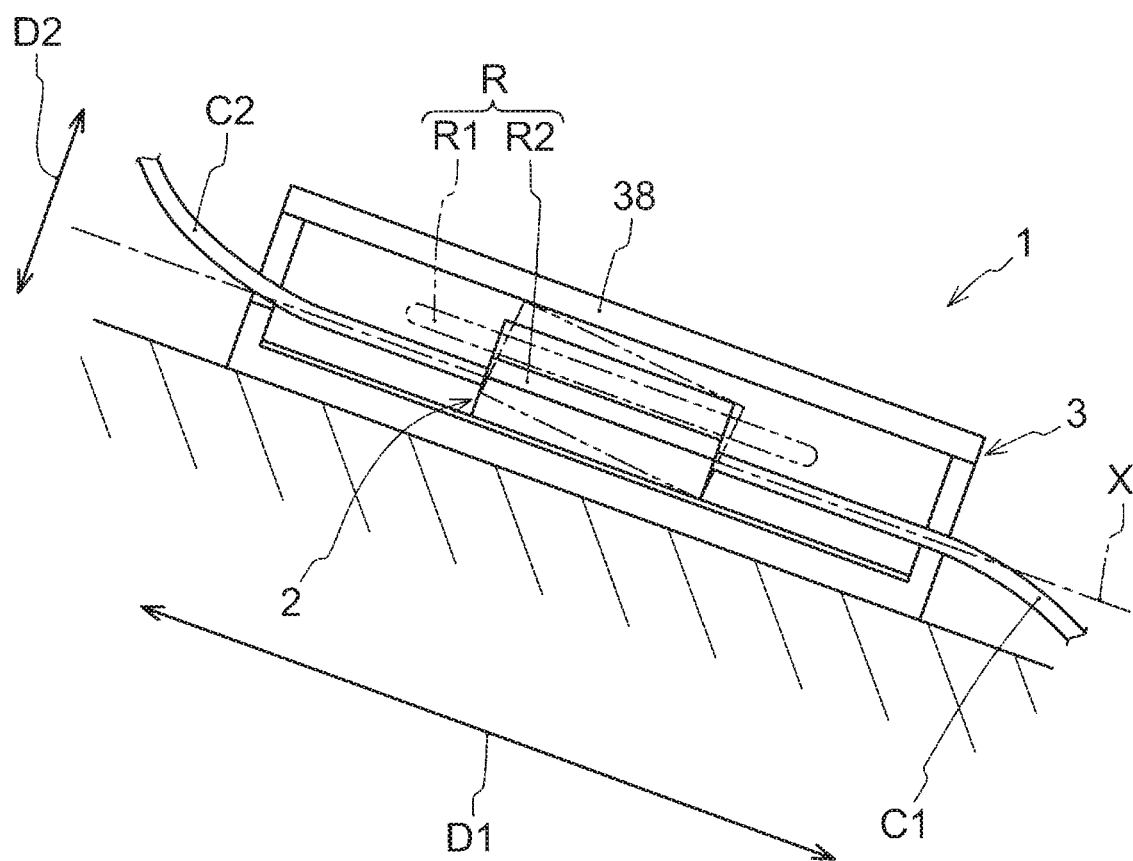
FIG. 4 schematically illustrates a state where the cable coupling mechanism according to the embodiment of the present invention is attached to an inclined attaching object.

In this case, if the movement of the slider 2 in the direction D2 perpendicular to the sliding direction axis X is not restricted, a force is applied in the direction in which the slider 2 rotates about an axis extending in the width direction D3, as indicated by an alternate long and two short dashes line in FIG. 4, and accordingly the slider 2 will be inclined to the sliding direction axis X. When the slider 2 is inclined, the operation force of the cables C1 and C2 will be partly lost by rattling or the like caused by the inclination of the slider 2. As a result, the force in the sliding direction D1 for causing the slider 2 to slide in the slider housing member 3 cannot be effectively transmitted and therefore the transmission performance of the operation force deteriorates.

Furthermore, the slider 2 in the inclined state will slide in contact with a portion of the slider housing member 3, such as the lid member 38, which is unexpected to contact with the slider 2. Thus, the slider 2 and the slider housing member 3 are worn away or generate abnormal noises.

As mentioned above, even when a force for rotating the slider 2 about an axis in the width direction D3 is applied to the slider 2, the slider-side contact portion R2 comes into contact with the housing member-side contact portion R1 so as to function as an abutting stopper suppressing the rotation of the slider 2 about the axis in the width direction D3. Accordingly, providing the slider-side contact portion (i.e., slider-side protrusion) R2 and the housing member-side contact portion (i.e., sidewall-side protrusion) R1 can suppress the deterioration of the transmission performance of the operation force from deteriorating by the rotation of the slider 2 about the axis in the width direction D3 in the slider housing member 3. Further, it is possible to suppress the slider 2 from inclining and coming into contact with the portion of the slider housing member 3, which should not be in contact with the slider 2, and suppress abrasion or abnormal noises of the slider 2 and the slider housing member 3.

In the present embodiment, the cable coupling mechanism 1 is attached to the attaching object in such a manner that the main opening 36 opens substantially upward in the attached state. Alternatively, the cable coupling mechanism 1 can be attached in such a manner that the main opening 36 opens in the cross direction. For example, the cable coupling mechanism 1 in FIG. 4 can be attached to the attaching object in a state being rotated about the X-axis by 90 degrees from the front side. In this case, the opening direction of the main opening 36 is the direction from the front side of the paper to the back side, and the sidewall 24b of the slider 2 serves as a sliding surface so that the slider 2 slides on the sidewall 31b of the slider housing member 3. Even in such a case, as described above, it is possible to suppress the fall of the slider 2 in the opening direction of the main opening, which may be caused when the cables C1 and C2 are curved and sterically routed.

DESCRIPTION OF REFERENCE NUMERALS AND SIGNS 1 cable coupling mechanism
2 slider
21 bottom portion
22a, 22b cable connecting portion
23a, 23b wall portion
24a, 24b sidewall
3 slider housing member
31a, 31 b sidewall
32 bottom portion
32a, 32b projecting line
33a, 33b endwall
34 communicating hole
35 fitting portion
36 main opening
37a, 37b cable insertion opening
38 lid member
38a hinge portion
38b locking claw
38c engaged portion
38d engaging protrusion
38e engaging hole
C1, C2 cable
CE1, CE2 cable end
D1 sliding direction of slider
D2 direction perpendicular to sliding direction axis
D3 width direction
R movement-restricting mechanism
R1 housing member-side contact portion (sidewall-side protrusion)
R2 slider-side contact portion (slider-side protrusion)
S space
X sliding direction axis of slider

The invention claimed is:
1. A cable coupling mechanism comprising:
a slider, a slider housing member housing the slider and having a space in which the slider is slidable, wherein
the slider has a bottom portion, a pair of wall portions coupled to opposing ends of the bottom portion in a sliding direction of the slider, and cable connecting portions to which cables are connected, each of the cable connecting portions is formed in a respective one of the pair of the wall portions and formed into a slit shape extending in a direction perpendicular to the sliding direction and in a direction departing from the bottom portion up to an end edge of each of the wall portions,
the slider housing member includes:
a slider housing member-side bottom portion,
a pair of sidewalls provided perpendicularly to the slider housing member-side bottom portion and along with sliding direction,
a pair of end walls coupled to opposing ends of the slider housing member-side bottom portion in the sliding direction,
a main opening opened in a direction perpendicular to the sliding direction of the slider so that the slider can be inserted into the space, and
cable insertion openings opened along the sliding direction of the slider so that each of the cables can be inserted, each of the cable insertion openings is formed in a respective one of the pair of the end walls and formed into a slit shape extending in a direction perpendicular to the sliding direction and in the direction departing from the bottom portion, and in a direction departing from the slider housing member-side bottom portion up to an end edge of each of the end walls; and
a movement-restricting mechanism configured to restrict the slider from moving in the direction perpendicular to the sliding direction and in the direction departing from the bottom portion, the movement-restricting mechanism includes:
a housing member-side contact portion provided along the sliding direction of the slider so as to be contactable with the slider, and
a slider-side contact portion being contactable with the housing member-side contact portion when a force in the direction perpendicular to the sliding direction and in the direction departing from the bottom portion is applied to the slider,
in the movement-restricting mechanism,
the housing member-side contact portion is a sidewall-side protrusion protruding from one of the pair of sidewalls to the space, and
the slider-side contact portion is a slider-side protrusion protruding toward one of the pair of sidewalls on which the housing member-side contact portion is provided,
the movement-restricting mechanism restricts the slider from moving in a direction from the slider housing member-side bottom portion to the main opening.

2. The cable coupling mechanism according to claim 1, wherein a width direction is a direction perpendicular to each of the sliding direction and the direction perpendicular to the sliding direction, and when a force for rotating the slider about an axis in the width direction is applied to the slider, the slider-side contact portion comes into contact with the housing member-side contact portion so as to function as an abutting stopper suppressing the slider from rotating about the axis in the width direction.

3. The cable coupling mechanism according to claim 1, wherein a width direction is a direction perpendicular to each of the sliding direction and the direction perpendicular to the sliding direction, and
the slider can be inserted into the space by elastic deformation such that a size of the slider housing member in the width direction becomes equal to or greater than a size of the slider in the width direction.

4. The cable coupling mechanism according to claim 1, wherein the slider housing member-side bottom portion is partly in contact with and slides on the slider housing member-side bottom portion.

* * * * *